Dec. 2, 1958  F. H. REICHEL ET AL  2,862,245
METHOD FOR PRODUCING FILMS
Filed Sept. 7, 1951  2 Sheets-Sheet 1
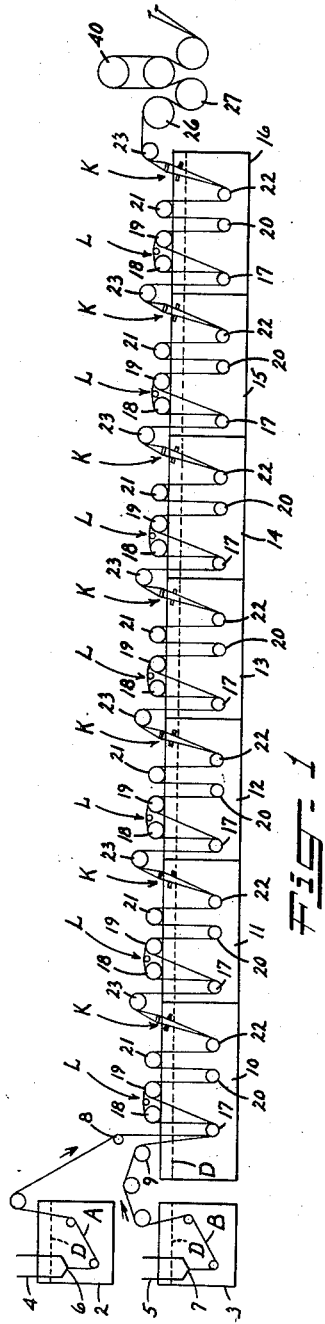
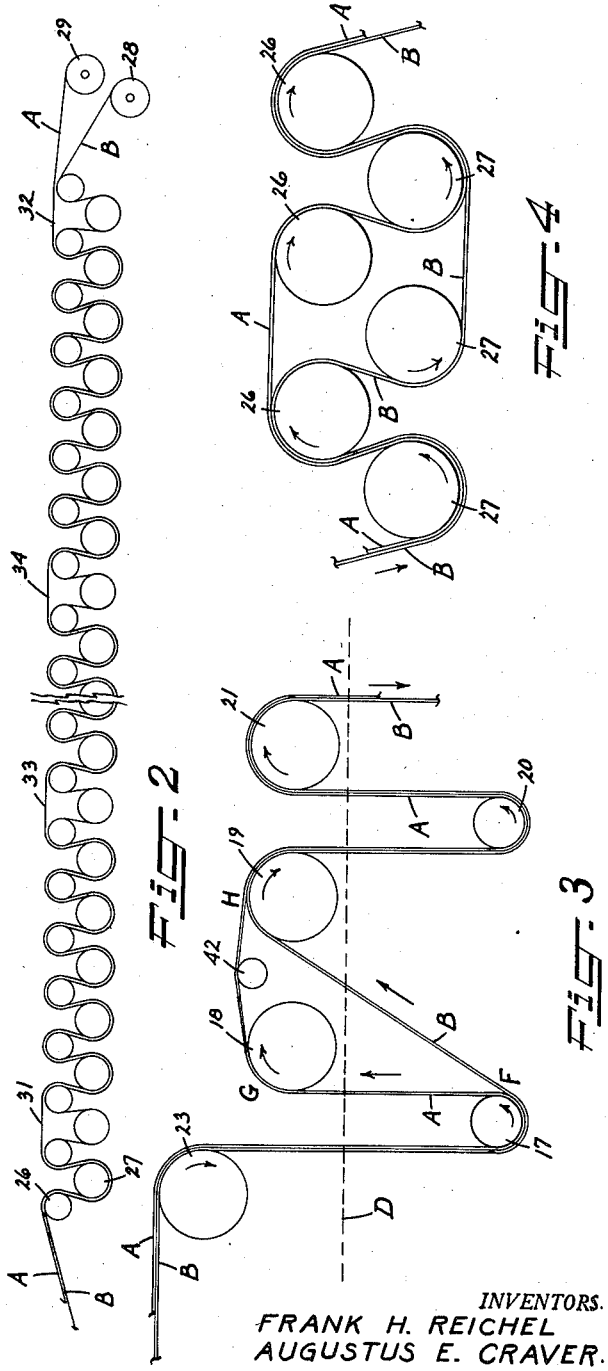
INVENTORS.
FRANK H. REICHEL
AUGUSTUS E. CRAVER.
BY Thomas R. O'Malley
ATTORNEY.

Dec. 2, 1958  F. H. REICHEL ET AL  2,862,245
METHOD FOR PRODUCING FILMS
Filed Sept. 7, 1951  2 Sheets-Sheet 2
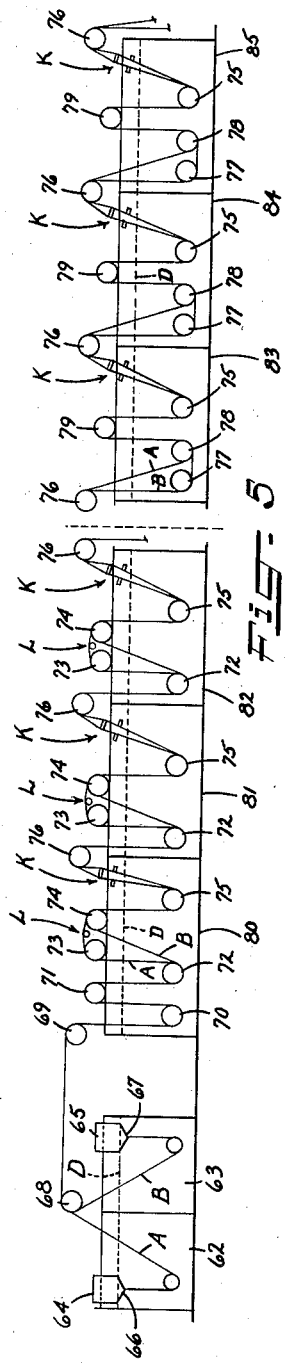
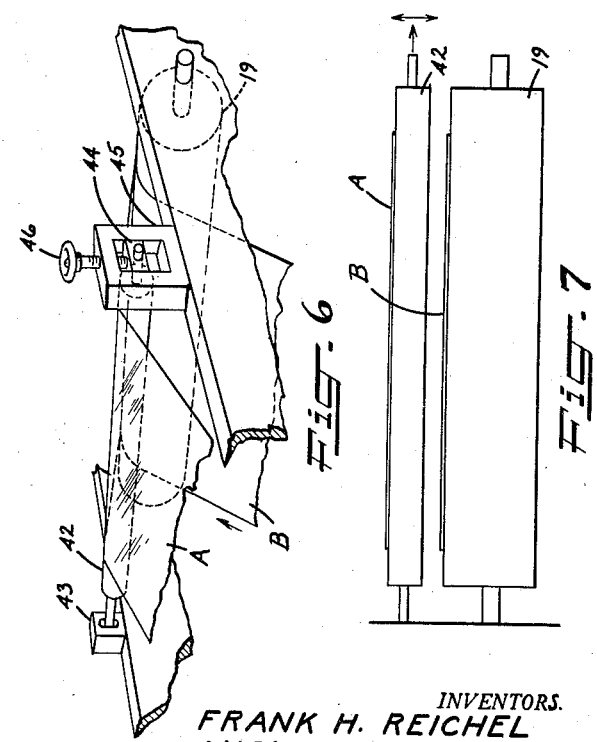
INVENTORS.
FRANK H. REICHEL
AUGUSTUS E. CRAVER

United States Patent Office 2,862,245
Patented Dec. 2, 1958

2,862,245

METHOD FOR PRODUCING FILMS

Frank H. Reichel, Villanova, Pa., and Augustus E. Craver, Fredericksburg, Va., assignors to American Viscose Corporation, Wilmington, Del., a corporation of Delaware Application September 7, 1951, Serial No. 245,612

2 Claims. (Cl. 18—57)

This invention relates to methods for producing simultaneously a plurality of films. More particularly, this invention relates to methods for producing simultaneously a plurality of films of improved quality comprising simultaneously forming a plurality of films, simultaneously subjecting the plurality of films to liquid treatments, and simultaneously drying the plurality of films.

Procedures for forming at the same time a plurality of films on a single machine have been suggested in the prior art. In one procedure, the films after passing through a coagulating bath are brought together with their adjacent surfaces in contact with each other and are maintained in this relation while they are advanced through the regenerating bath and through subsequent liquid after treating baths. In another procedure, the films are coagulated and are brought together and then are simultaneously passed through the various liquid after treating baths. In this latter procedure, care is taken to assure that the films pass through the baths along separate paths of exactly the same length.

It is found that in order to insure uniform liquid treatment and to permit the escape of vapors and gaseous products that are formed between the films, it is desirable to separate the films as they pass through the various liquid treating baths. However, it has also been found that if the films are separated by directing the films through the baths along separate paths of exactly the same length, the films are always placed together in the same relation lengthwise of the films after each time they are separated which tends to cause irregularities in the resulting films.

This invention has for an object to provide methods for forming a plurality of films on a single machine that overcome difficulties and disadvantages found in methods of the prior art.

Another object of this invention is to provide methods for simultaneously forming and liquid treating a plurality of films on a single machine whereby films of improved quality are obtained.

A further object of the invention is to provide improvements in methods of simultaneously drying a plurality of films.

Other objects and advantages of the invention will be apparent from the following description and the accompanying drawing.

In the drawing,

Figure 1 is a side view of a form of apparatus in which is diagrammatically shown a procedure for coagulating and liquid after treating a plurality of films embodying the present invention.

Figure 2 is a side view of a form of apparatus in which is diagrammatically shown a procedure for drying a plurality of films on a single drier embodying the present invention.

Figure 3 is an enlarged view diagrammatically showing an arrangement whereby a plurality of films may be separated in a liquid treating bath in accordance with the present invention.

Figure 4 is an enlarged view diagrammatically showing the manner in which a plurality of films are separated during the drying operation in an embodiment of this invention.

Figure 5 is a side view of a form of apparatus in which is diagrammatically shown another procedure for coagulating and liquid after treating a plurality of films embodying another form of the present invention.

Figure 6 is a perspective view of a means for adjusting one film in a lateral direction relative to the other.

Figure 7 is a side view diagrammatically showing the apparatus of Figure 6 and the manner in which it is operated.

Figure 8 is a side view of a portion of the apparatus shown in Figures 1 and 5 showing the means for stripping the excess liquid from both sides of each of the films as they pass from a liquid treating bath.

In this invention, film forming material is extruded through slit-like nozzles positioned in the same coagulating bath or each positioned in a separate bath, and the plurality of at least partially coagulated films are brought together with their adjacent surfaces in contact with each other. They are then simultaneously passed through the various conventional coagulating and/or regenerating, washing, desulfurizing, bleaching, and softening baths in sinuous paths. While passing upwardly or downwardly through the baths, the films are separated by guide means or the like so that for a portion of their travel while passing through a bath and while emerging therefrom or while entering a bath and passing through the bath for a portion of their travel, the films are spaced apart, and the path of travel of one film is greater than that of the other. The separation of the films permits the bath to contact both sides of each film and permits the discharge of vapors and gases that are formed between the films. The path of the portion of one film that is separated being greater than the other, the films are not placed together in the same relation longitudinally of the films each time after they have been separated. The successive points of contact of the films being placed together are thereby, in effect, staggered thereby providing greater uniformity of the liquid treatments and the formation of more uniform films. The films after being subjected to the various liquid after treating baths are then dried by passing the plurality of films over a plurality of heated rolls or the like. The plurality of films positioned with their adjacent surfaces in contact with each other are directed together over and around the drying rollers in a sinuous path. To remove water vapor that is formed between the films and to prevent cementing of the films together, as soon as the films reach the temperature of the drying rollers and water vapor is being formed between the films, the films are separated for a short distance to permit the escape of the water vapor. This separation also permits the films to shrink widthwise independently of each other and prevents wrinkling and straining of the films. The films are then placed together with adjacent surfaces in contact with one another, and the films are directed over the drying rolls to the end of the drying means. The films are separated adjacent the end of the drying means and are each separately directed to wind-up rolls. To remove further water vapor as it is formed, the films may be separated a plurality of times as they pass through the drying means between the separation zones referred to adjacent each end of the drying means.

The process of this invention is applicable to the casting of two or more films simultaneously from various coagulable film-forming hydrophilic colloids such as, for example, viscose, aqueous solutions of cellulose in inorganic or organic solvents such as zinc chloride, cupra ammonia, organic amines and the like, also water soluble and alkali soluble cellulose ethers, gelatin, casein, and water soluble vinyl acetate and polyvinyl alcohol and the like. The expression "film" as used above and hereinafter is intended to include any of these classes of materials all of which are capable of being coagulated in the form of a continuous film from their aqueous dispersions.

Referring to Figure 1 of the drawings where embodiments of the invention are diagrammatically shown, reference characters 2 and 3 indicate coagulating baths in which the hoppers 4 and 5 having the slit extrusion nozzles 6 and 7, are positioned. Film forming material, such as viscose or the like, is extruded through the nozzles into the coagulating baths where the film forming material is at least partially coagulated in the form of films A and B. The baths 2 and 3 as shown are spaced apart one above the other so that an attendant may inspect the extrusion nozzles positioned in each of the baths. The at least partially coagulated films are withdrawn from the baths over the guide means 8 and 9 and then are directed simultaneously through the successive coagulating and/or regenerating, washing, desulfurizing, bleaching, and softening baths indicated generally by reference characters 10, 11, 12, 13, 14, 15, and 16 respectively, through which the films travel in upwardly and downwardly directed paths. The level of the liquid in the baths is shown by the dotted line indicated by reference character D. In the embodiment of the invention shown in Figure 1, the upwardly moving portions of the films are separated at least while going through the coagulating and/or regenerating baths and preferably all the baths up to and including the desulfurizing bath. It is also desirable that the films be separated while passing through the baths after the desulfurizing bath. The films A and B are together directed into the coagulating and/or regenerating bath 10 and pass around the roller or guide means 17 immersed in the bath. The films are then separated and the lower film B passes upwardly out of the bath and around the roller or guide means 19, while the upper film A has a longer path of travel from the roller 17 upwardly out of the bath over the roller or guide means 18 then to the roller or guide means 19 where the two films are again positioned together with their adjacent surfaces in contact with each other. The two films together then pass downwardly and upwardly in a sinuous path around the roller or guide means 20, 21, and 22 during their further travel through the bath. The films together then pass over the roller or guide means 23 then through the next bath. The films pass through the next and succeeding baths in the manner that the films pass through the coagulating and/or regenerating bath 10 as described above. While only one separation of the films in each bath are shown, more separations and passes of the films through the baths may be provided for.

Referring to Figure 3 of the drawing wherein is shown an enlarged view of the manner in which the films may be separated in the baths in accordance with this invention, the films A and B positioned with their adjacent surfaces in contact with one another are passed over the roll or guide means 23 down into the liquid bath, the level of which is shown by the dotted line indicated by reference character D. The two films together pass down into the bath and around the roll or guide means 17 immersed in the bath. The films are separated on leaving the roll 17 at the location F. The lower film B passes upwardly to and around the roll or guide means 19. The upper film A passes upwardly to and around the roll or guide means 18 in the position G and then to the roll or guide means 19 where it is again positioned in contact with the lower film B at the position H. As seen from the drawing, the portion of the lower film B that is separated extends from the position F to the position H while the portion of the upper film A that is separated extends from the position F to the position G and then to position H. The path of the separated portion of the film A is greater than that of the film B so that the films are not placed back in contact with each other in the same position longitudinally of the films. The effect of the difference in the paths of travel of the separated portions is to shift one film longitudinally of the other so that the points of contact of the films being positioned together will be in a number of places along the films.

To assure that the films will be placed together with their edges in alignment so that the films will be uniformly treated throughout by the treating liquids and overlapping of the films along the edges will be avoided, the means generally indicated by reference character L and shown more particularly in Figures 6 and 7, are provided to adjust the upper film in a lateral direction relative to the lower film. The adjusting means comprises the roller member 42 that is positioned between the separated films and over which the upper film is directed. The roller is rotatably mounted in bearings at each end. The bearing at one end is pivotally mounted in the block 43 so that the bearing 44 at the other end of the roller may be moved up or down. The bearing 44 is moved either up or down in the guide block 45 by means of the adjusting screw 46 that is connected to the bearing 44. The film A will move toward the higher end of the roller 42. To move the upper film A relative to the lower film B and toward the right as shown in Figures 6 and 7, the bearing 44 of the roller 42 is raised in the guide block by means of the adjusting screw. To cause the upper film A to be shifted relative to the lower film B toward the left as shown in Figures 6 and 7, the bearing 44 of the roller 42 is lowered in the guide block by means of the adjusting screw 46. The adjusting means is positioned near the beginning end of the liquid treating means, for example where the upper and lower films are first separated and between the rollers 18 and 19. To provide for further adjustment of the films, adjusting means may also be provided in additional places where the films are separated.

Excess liquid may be removed from the films during the upward passage of the films after they have emerged from a bath, and to prevent excess carryover of liquid from one bath into the next bath, stripper means indicated generally by reference character K and shown more particularly in Figure 8 of the drawings, may be provided. The films as they pass upwardly, as shown by the arrow, from the roller 22 to the roller 23 positioned above and between adjacent baths, are slightly separated. The wiper blade 24 contacts the inner surface of each of the films, and the wiper blades 25 contact the outer surfaces so that excess liquid is removed from both surfaces of each film and is returned to the bath as the films move upwardly before passing to the next bath.

Referring to Figure 5 of the drawings in which another embodiment of the invention is shown, reference characters 62 and 63 indicate coagulating baths in which the hoppers 64 and 65 having the slit extrusion nozzles 66 and 67, are positioned. The film forming material, such as viscose or the like, is extruded through the nozzles into the coagulating baths where the film forming material is at least partially coagulated in the form of films A and B. The at least partially coagulated films are withdrawn from the baths over the guide means 68 and 69 and are then directed simultaneously through the successive coagulating and/or regenerating, washing, desulfurizing, bleaching, and softening baths indicated generally by reference characters 80, 81, 82, 83, 84, and 85, through which the films travel in upwardly and downwardly directed paths. The coagulating bath 63 is spaced from the coagulating and/or regenerating bath 80, and the hoppers 66 and 67 are positioned at opposite ends of the coagulating and/or regenerating baths so that an attendant may inspect the extrusion nozzles positioned in each of the baths. The level of the liquid in the various baths is shown by the dotted line indicated by reference character D. The films are separated while going through the various baths. The films A and B are directed together in superposed relation with the film A on top into the coagulating and/or regenerating bath 80 and passed downwardly around the roller or guide means 70 immersed in the bath then upwardly over the roller or guide means 71 above the bath then again downwardly around the roller or guide means 72 that is immersed in the bath. The films are then separated and the lower film B passes upwardly out of the bath and around the roller or guide means 74, while the upper film A has a longer path of travel from the roller 72 upwardly out of the bath over the roller or guide means 73 then to the roller or guide means 74 where the two films are again positioned together with their adjacent surfaces in contact with each other. The two films together then pass downwardly around the roller or guide means 75 that is immersed in the bath then over the roller or guide means 76 that is positioned above and between the adjacent baths. The films in passing from the rollers 75 and 76 are slightly separated, and the excess liquid is removed from the films by the wiper means indicated by reference character K shown more particularly in Figure 8 and described above. The films pass through successive baths of the first half of the liquid treating baths and are separated at intervals in like manner as in the first bath. While passing through the successive baths comprising the first half of all of the baths, the films are so separated that the upper film A has a longer path of travel than the lower film B so that each time the films are placed together after being separated, they are placed together in a new relation longitudinally of the films. While passing through the successive baths comprising the last half of all the liquid treating baths, the films are so separated at intervals that the lower film B has a longer path of travel than the film A. As shown, the films pass together over the roller 76 downwardly into the bath 83. The lower film B passes over the roller 77 and then to the roller 78 which are immersed in the bath and then upwardly to the roller 79 that is positioned above the bath. The upper film A passes from the roller 76 directly around roller 78 and then upwardly to the roller 79. As seen, the path of the lower film B from the roller 76 over roller 77 and then to roller 78 is longer than the path of the upper film A that goes directly from the roller 76 to the roller 78. The difference in the lengths of the paths of the films in effect shifts one film relative to the other in a longitudinal direction so that they are not placed together in the same relation as they were before they were separated. The films together after passing around the upper roller 79 pass downwardly into the bath around the roller 75 and then upwardly around the roller 76 that is positioned above and between the adjacent baths. The films are separated slightly while passing between the rollers 75 and 76, and excess liquid is removed from the films by the wiper means K. The films in the same manner then pass through the successive baths to the end of the liquid treating means. During the first half of the liquid treatments, the upper film A has a longer path of travel so that the film A is in effect shifted in a longitudinal direction relative to the lower film B. During the second half of the liquid treatments, the lower film B has a longer path of travel than the upper film A so that the film B is in effect shifted in a longitudinal direction relative to the film A. The amount that the film B is shifted in the second half of the liquid treatments is the same as the amount that the film A was shifted in the first half of the liquid treatments so that on leaving the last liquid bath, the films are positioned together in subsantially the same relation as when they entered the first liquid treatment bath.

The films after being subjected to the various liquid treatments are then passed to a drying means which comprises a plurality of heated upper and lower rolls or the like 26 and 27. The films together are passed over and around the upper and lower rolls in a sinuous path until at least one of the films reaches the temperature of the heated rolls and water vapor is being formed between the films. In a preferred procedure, the films contain approximately 70 to 75% moisture at this position. The films are then separated as shown at the location 31 by passing the upper film A directly across a pair of the upper rolls 26 skipping the adjacent lower roll 27 while the lower film B goes around that adjacent lower roll 27. The films are then positioned together and passed over and around the rolls to a position adjacent the end of the drying means indicated by reference character 32. The films are then separated by passing the upper film A directly across a pair of the upper rolls skipping the adjacent lower roll 27 while the lower film B goes around that lower roll 27. The films are separatey wound up on the take-up rolls 28 and 29. To insure the removal of the vapors that are formed between the films, blower means or the like may be provided with means to direct heated air between the separated films to remove vapor from between the films. In order to remove vapors that are formed between the films as the drying of the films continues, the films may also be separated at additional places along the length of the drying means as shown by reference characters 33 and 34. In a preferred practice of the invention, the films are also separated between the first and last separation positions when the films contain from approximately 50 to 55% moisture, approximately 25 to 30% moisture, and again when the films contain from approximately 8 to 12% moisture.

Instead of separating the films by having one of the films skip one of the rollers as described above, an additional drying roller such as heated roller 40 shown in Figure 1, may be provided which is positioned above the other rollers. With this arrangement, the upper film A, after passing around a lower roller 27, is passed upwardly and around the roller 40. The lower film is passed around the roller 26 so that the films are spaced apart between the rollers 40 and 26. The films are then positioned together and passed around the lower roller 27.

In Figure 4 is shown diagrammatically another manner of separating the films on the drying means which results in more uniform drying. In this arrangement the upper film A skips a lower roll 27 and passes directly over to the adjacent upper roll while the lower film B in approximately the same position along the drying means skips an upper roll 26 and passes over to the adjacent lower roll 27. Both portions of the films that are separated are spaced apart by the same amount and each are free from the heated rolls for approximately the same distance. Blower means or the like are provided for removing vapors that have formed between the films and the same lengths of each of the films are subjected to this vapor removing procedure.

The separation of the films during the drying procedure removes vapor that would otherwise collect between the films and facilitates the drying of the films, also separating the film prevents or lessens the tendency of the films to be cemented together. Further, as the films shrink widthwise during the drying step, the films are able to shrink independently of each other in the zone in which they are separated. This prevents the formation of strains or wrinkles in the films which would otherwise be caused by one film tending to shrink and being restrained by contact with the other film.

While preferred embodiments of the invention have been shown, it is to be understood that changes and variations may be made without departing from the spirit and scope of the invention as defined in the appended claims.

We claim:

1. The method of forming a plurality of regenerated cellulose films comprising extruding viscose through a plurality of nozzles into a coagulating liquid, withdrawing the at least partially coagulated films from the coagulating liquid, positioning the films together with their adjacent surfaces in contact with each other, passing the films through treating liquid, separating portions of the films a plurality of times as they pass through the treating liquid, directing successive separated portions of one of the films through a plurality of paths each of greater length than the paths of corresponding successive separated portions of the other film while passing through the treating liquid, and then positioning the films together with their adjacent surfaces in contact with each other.

2. The method of forming a plurality of regenerated cellulose films comprising extruding viscose through a plurality of nozzles into a coagulating liquid, withdrawing the at least partially coagulated films from the coagulating liquid, positioning the films together with their adjacent surfaces in contact with each other, passing the films through a first and then a second group of liquid after treating baths, separating portions of the films a plurality of times as they pass through each of the groups of liquid after treating baths, directing successive separated portions of one of the films through a plurality of paths each of greater length than the paths of the corresponding successive separated portions of the other film while passing through the first group of liquid after treating baths, directing successive separated portions of the other film through a plurality of paths each of greater length than the paths of the corresponding successive separated portions of the first film while passing through the second group of liquid after treating baths so that both films have the same length of travel while passing through the sum of the liquid after treating baths and positioning the films together with their adjacent surfaces in contact with each other after each separation.

References Cited in the file of this patent

UNITED STATES PATENTS

| | | |
|---|---|---|
| 1,548,864 | Brandenberger | Aug. 11, 1925 |
| 1,590,595 | Hill | June 29, 1926 |
| 1,660,640 | Asten | Feb. 28, 1928 |
| 2,030,843 | Atkinson | Feb. 18, 1936 |
| 2,070,252 | Borner | Feb. 9, 1937 |
| 2,299,459 | Chatain | Oct. 20, 1942 |
| 2,433,122 | Hornbostel | Dec. 23, 1947 |
| 2,445,333 | Nichols | July 20, 1948 |
| 2,622,340 | Veyret | Dec. 23, 1952 |
| 2,623,244 | Veyret | Dec. 30, 1952 |

FOREIGN PATENTS

| | | |
|---|---|---|
| 423,365 | Great Britain | Jan. 29, 1935 |